United States Patent

Johnson

Patent Number: 5,846,300
Date of Patent: Dec. 8, 1998

[54] FABRIC FILTER WITH GAS INLET GEOMETRY AND METHOD

[75] Inventor: Howard F. Johnson, Bilgola Plateau, Australia

[73] Assignee: Lurgi (Australia) PTY Limited, South Melbourne, Australia

[21] Appl. No.: 669,468

[22] PCT Filed: Dec. 1, 1994

[86] PCT No.: PCT/AU94/00738

§ 371 Date: Jul. 9, 1996

§ 102(e) Date: Jul. 9, 1996

[87] PCT Pub. No.: WO95/18662

PCT Pub. Date: Jul. 13, 1995

[30] Foreign Application Priority Data

Jan. 10, 1994 [AU] Australia ................ PM 3290

[51] Int. Cl.⁶ ............... B01D 46/02; B01D 46/04
[52] U.S. Cl. ............... 95/280; 55/294; 55/302; 55/341.1; 55/418; 55/419; 95/286
[58] Field of Search ............... 95/273, 286, 280, 95/268; 55/294, 334, 335, 341.1, 341.6, 344, 418, 419, 350.1, 302

[56] References Cited

U.S. PATENT DOCUMENTS

| | | | |
|---|---|---|---|
| 1,743,934 | 1/1930 | Ruemelin | 55/341.1 |
| 3,251,473 | 5/1966 | Fuhring | 55/341.1 |
| 3,726,066 | 4/1973 | Colley et al. | 55/341.1 |
| 4,157,899 | 6/1979 | Wheaton | 55/273 |
| 4,521,231 | 6/1985 | Shilling | 55/341.1 |
| 4,764,190 | 8/1988 | Israelson et al. | 55/341.1 |
| 4,854,951 | 8/1989 | Stephenson | 55/302 |
| 4,872,981 | 10/1989 | Hobson, Jr. | 55/418 |
| 4,878,927 | 11/1989 | Margraf | 55/341.1 |
| 4,883,509 | 11/1989 | Giusti et al. | 55/418 |
| 5,387,406 | 2/1995 | Ruoff | 55/341.1 |
| 5,514,195 | 5/1996 | Durst et al. | 55/419 |

FOREIGN PATENT DOCUMENTS

| | | |
|---|---|---|
| 3930765 | 2/1991 | Germany . |
| 91/09662 | 7/1991 | WIPO ................ 55/418 |
| 93/20924 | 10/1993 | WIPO . |

Primary Examiner—Duane S. Smith
Attorney, Agent, or Firm—Snell & Wilmer

[57] ABSTRACT

The present invention provides a fabric filter apparatus and a method of feeding dusty gas to the dusty gas section of a fabric filter apparatus. The housing (11) of the fabric filter apparatus includes at least one substantially vertically extending duct (13) the lower end of which is in fluid communication with the dusty gas inlet (31). The duct diverts a portion of the dusty gas entering the fabric filter apparatus and delivers it to a corner of the housing (11) at a position intermediate the level of the porting plate (40) and the bottom of the circular filter bag array (50).

13 Claims, 3 Drawing Sheets

FABRIC FILTER WITH GAS INLET GEOMETRY AND METHOD

TECHNICAL FIELD

The present invention relates to a fabric filter for the removal of particulate matter from a gas stream and more particularly to such a fabric filter having an improved gas inlet geometry.

BACKGROUND OF THE ART

Fabric filters are known in which a gas stream to be cleaned is directed through a group of elongate filter bags from their outside to their inside. The bags are periodically cleaned, such as by periodically injecting into them, against the gas stream, a gas pulse which serves to briefly reverse the direction of gas flow through the filter bags and to thereby remove from the outside of the bags particulate matter that had been retained on the filter bags. U.S. Pat. No. 4,157,899 discloses such a fabric filter.

In fabric filters of this type the group of filter bags is typically disposed in a housing body having a dusty gas section with an inlet thereto and a clean gas section with an outlet therefrom. A porting plate is mounted in the housing body separating the dusty and clean gas sections and has a plurality of concentric rings of ports. A filter bag is supported from each port in the porting plate and hangs into the dusty gas section. A backflushing means are mounted in the clean gas section and are adapted to direct gas pulses to sequentially backflush the filter bags.

In most known fabric filter dusty gas is discharged directly into the dusty gas section of the fabric filter housing. Although inexpensive, this method of entry creates a great deal of turbulence and uneven velocities between filter bags which can result in bag abrasion and re-entrainment of dust following pulsing. It is also known to provide a plenum between the filter bags and a wall of the housing across its width. This allows the dusty gas to enter the housing at lower velocities than would otherwise be the case. Such plenums are, however, wasteful of space and for this reason have not been universally accepted.

SUMMARY OF THE INVENTION

In a first broad aspect, the present invention provides a fabric filter apparatus having a housing defining a dusty gas section with an inlet thereto and a clean gas section with an outlet therefrom, a porting plate mounted in the housing separating the dusty gas section from the clean gas section and a substantially circular array of fabric filter bags depending therefrom; said housing further including a generation/distribution means to generate pulses of backflushing gas and distribute them periodically into the open upper ends of the fabric filter bags through respective ports in the porting plate, wherein at least one duct is provided in the housing, the bottom of the duct being in fluid communication with the inlet, the top of the duct opening into a corner of the housing at a level intermediate the inlet and the porting plate.

The inlet of the inventive fabric filter apparatus may be elongated in the horizontal direction with the duct being in fluid communication with a lateral end of the inlet. It is also possible to provide two such ducts in fluid communication with opposite lateral ends of the inlet.

Preferably, the housing is provided with a plurality of substantially planar sides eg. four planar sides to form a square or rectangle, and is provided with two substantially vertically extending ducts disposed in adjacent corners of the housing.

The inlet of the housing is preferably positioned to open into a downwardly tapering hopper forming the lower end of the housing. A damper may be mounted in the inlet to control gas flow into the housing.

The lower portion of each duct is also preferably provided with a bleed aperture sized to allow particulate matter falling out of the dusty gas stream to escape from the duct.

In a second broad aspect, the present invention provides a method of feeding a dusty gas to a dusty gas section of a fabric filter, said filter further including a clean gas section, a porting plate mounted between the dusty gas section and clean gas section with a circular array of fabric filter bags depending from the porting plate and a generation/distribution means to generate pulses of backflushing gas and distribute them periodically into the open upper ends of the fabric filter bags through respective ports in the porting plate, said method comprising feeding a first portion of the dusty gas directly into the housing at a position below or adjacent the bottom of the fabric filter bag array and diverting a second portion of the dusty gas from the inlet and delivering the diverted dusty gas to at least one corner of the housing at a level intermediate the inlet and the porting plate.

The second portion is preferably between 10% and 90% of the total dusty gas flow entering the filter.

Preferably, the dusty gas is fed to the dusty gas section via an inlet elongated along one side of the housing. The dusty gas is preferably diverted substantially vertically from either or both lateral ends of the elongated inlet opening.

Most preferably the housing is provided with a plurality of substantially planar sides with dusty gas being diverted vertically from both lateral ends of the inlet and delivered to adjacent corners of said housing at a level intermediate the inlet and the porting plate.

The arrangement according to the present invention has four substantial advantages over the prior art. Firstly, by introducing gas further up the filter bag array there is a significant reduction in the plan area and in the capital construction cost. This is achieved by the gas in the vertically extending ducts travelling at velocities significantly higher than can be tolerated by the filter bags and by utilising the previously unused corners of the housing which surround the circular array of filter bags. Secondly, flow patterns into the array of filter bags are improved by introducing gas further up the bag array promoting a sideways and downward gas flow from the ducts and thereby maximising particulate preseparation i.e. the entrained particulate matter dropping out of the gas stream and falling into the hopper without having been trapped on the surface of a filter bag. Thirdly, by minimising the vertical velocity beneath and upward through the bag array re-entrainment of the duct cleaned off the filter bags is minimised thereby lowering cleaning air/energy requirements and prolonging bag life. Fourthly, providing a more uniform distribution of dusty gas around the bag bundle and into each individual bag, cleaning air requirements will be minimised and bag life further improved.

BRIEF DESCRIPTION OF THE DRAWINGS

For the purposes of clarification, the present invention will now be described by way of example only with reference to the accompanying drawings in which.

DESCRIPTION OF THE PREFERRED EMBODIMENT(S)

Figure 1:
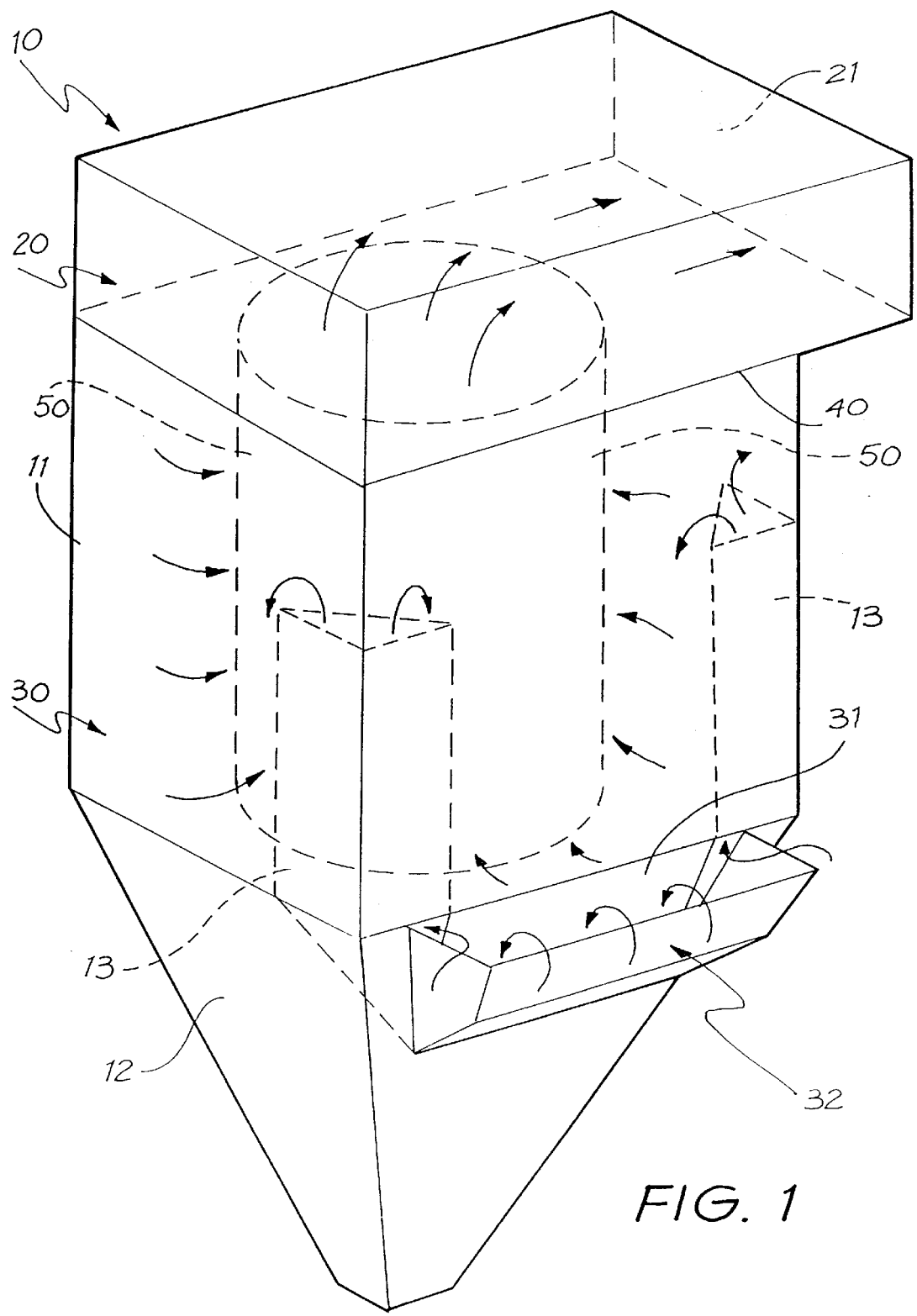
FIG. 1 is a perspective view of a fabric filter apparatus according to the first embodiment of the present invention.
Figure 2:
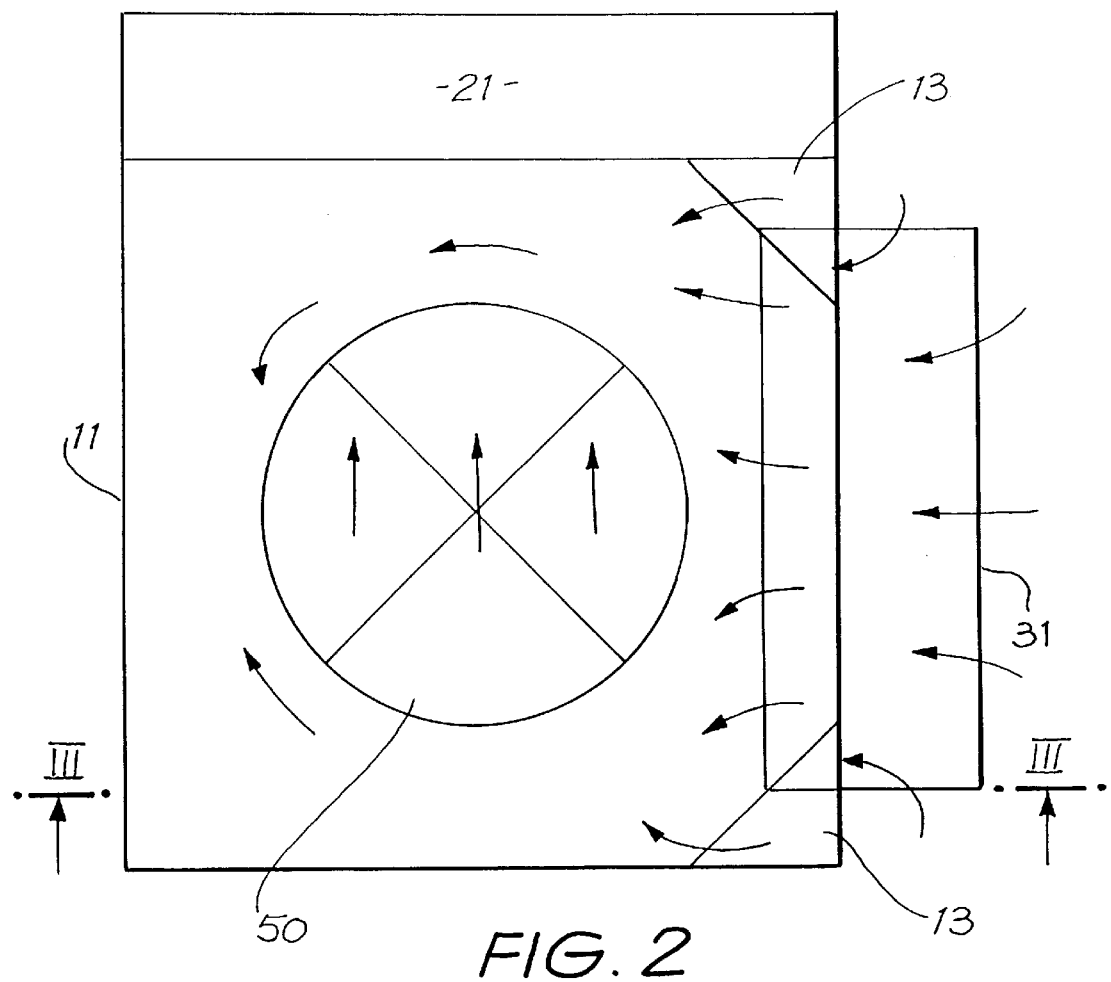
FIG. 2 is a sectional plan view of the apparatus of FIG. 1.

In the drawings the arrows indicate likely gas flow. Referring to FIG. 1 the fabric filter apparatus 10 comprises a housing 11 having at its lower end an inwardly tapering hopper 12. The housing 11 is divided into upper clean gas zone 20 and lower dusty gas zone 30. A porting plate 40 is provided therebetween from which a circular array of filter bags 50 depend. Please note that the relative sizes of the various components are not to scale.

Figure 3:
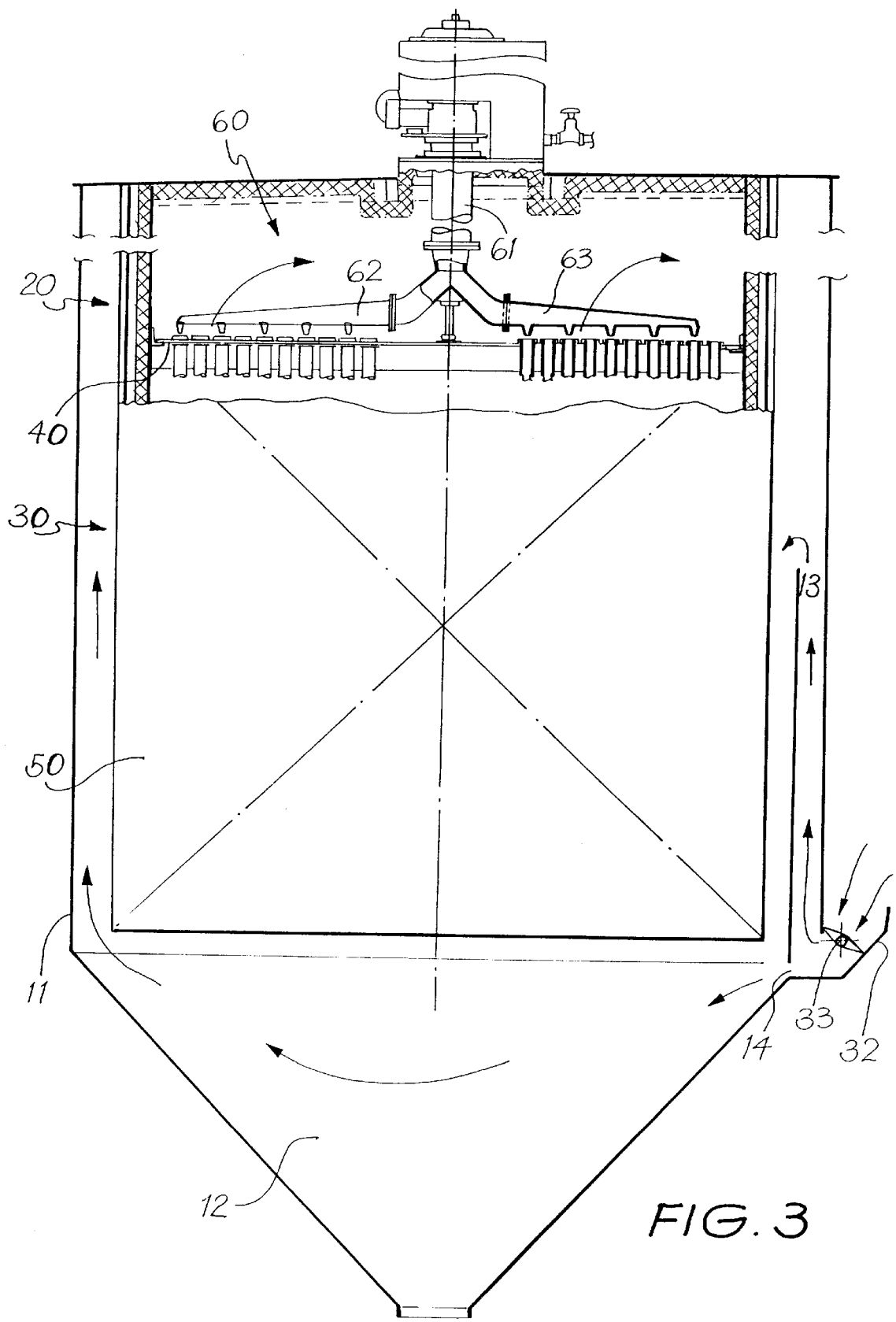
FIG. 3 is a sectional elevational view along section III—III of FIG. 2.

The porting plate 40 has a series of radially spaced concentric ring of ports. Each of these ports communicates with a respective filter bag of the circular filter bag array 50. Above the porting plate is a gas pulse generation/distribution system 60 (see FIG. 3) substantially as disclosed in U.S. Pat. No. 4,854,951 the contents of which are incorporated herein by reference.

The gas pulse generation/distribution system 60 includes a vertically extending inlet tube 61 which is connected at its lower end to a pair of radially extending gas manifolds 62 and 63. Each manifold 62 and 63 extends across and above the porting plate 40 and carries a plurality of downwardly directed nozzles. The nozzles of manifold 62 are positioned so that they respectively rotate over one of the even numbered rings of ports while the nozzles of manifold 63 are positioned so that they respectively rotate over one of the odd numbered rings of ports. Clearly the generation/distribution system 60 can be produced in alternative manners as a matter of design preference. For example, the nozzles of each manifold 62 and 62 can be arranged as a plurality of equally radially spaced pairs, each nozzle 25 of a respective pair aligning upon rotation with its respective ring of ports.

A dusty gas inlet 31 extends across one face of the housing 11 and opens preferably into hopper 12. As more clearly shown in FIG. 3, this inlet comprises an inlet hopper 32 and damper 33 disposed in the inlet hopper and adapted to control the volume of the gas flowing through the inlet hopper 31 into housing 11. In the embodiment shown, the damper is provided by a rotatable vane however any suitable air damper means may be used.

The housing 11 includes at least one duct 13 the bottom of which is in fluid communication with inlet 31. The top of the duct 13 opens into the housing 11 at a position intermediate the inlet 31 and the porting plate 40. In the embodiment shown, two ducts 13 extend substantially vertically in adjacent corners of the housing, the bottoms of these ducts being in fluid with the communication with opposite lateral ends of inlet 31.

The inventive apparatus operates as follows. A vacuum is provided in the clean gas section 20 so that a first portion of the dusty gas is drawn through inlet 31 and into the housing 11 at a position adjacent or below the circular filter bag array 50.

Ducts 13 in housing 11 divert a second portion of the dusty gas entering the housing from the inlet 31 and deliver it to a corner of the housing at a level intermediate the porting plate 40 and inlet 32.

The ducts may be sized according to the amount of inlet flow to be diverted. Between 10% –90% of the total dusty gas entering the filter may be diverted to a corner of the housing at a level intermediate the porting plate and the inlet.

This improves the flow patterns of the dusty gas around the circular filter bag array by promoting a sidewards downwards gas flow to maximise particulate pre-separation. Further, since part of the inlet flow is diverted this minimises the vertical velocity beneath and upwards through the bag bundle thereby reducing re-entrainment of the dust cleaned off the filter bags. A more uniformed distribution of dusty gas around the bag bundle is also provided.

The dusty gas in the housing is then drawn through the circular filter bag array 50 with the particulate matter in the dusty gas being separated by the filter bags. The clean air then passes through the open upper end of the filter bags into the clean air section 20 where it is removed via outlet 21.

In a preferred embodiment, each inlet duct is provided with a small bleed aperture 14 at its lower end so that any particulate matter that may drop out of he dusty gas stream in duct 13 may be discharged from its lower end and directed into hopper 12.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A fabric filter apparatus having a prismatic housing defining a dusty gas section with an elongate horizontal inlet thereto and a clean gas section with an outlet therefrom, a porting plate mounted in the housing separating the dusty gas section from the clean gas section and a substantially circular array of fabric filter bags depending therefrom, the inlet being adjacent the lowermost end of the filter bags; said housing further including a generation/distribution means to generate pulses of back flushing gas and distribute them periodically into the open upper ends of the fabric filter bags through respective ports in the porting plate, characterized in that respective dusty gas flow ducts are located in each of two corners of the prismatic housing at opposed lateral ends of the inlet, said ducts being in fluid communication with the inlet so as to direct a portion of the dusty gas inflowing through the inlet upwardly of the housing to exit each duct at a level intermediate the inlet and the porting plate.

2. A fabric filter apparatus as claimed in claim 1 wherein said housing is provided with a plurality of substantially planar sides, each duct extending substantially vertically upwards in a corner of the housing from a lateral end of the inlet.

3. A fabric filter apparatus as claimed in any one of claims 1 or 2 wherein said housing has four planar sides and is provided with two substantially vertically oriented ducts, the inlet extending along one side of the housing with each of the two ducts being disposed in adjacent corners of the housing.

4. A fabric filter apparatus as claimed in any one of claims 1 or 2 wherein the lower end of the housing if formed by a downwardly tapering hopper, the inlet opening into the hopper.

5. A fabric filter apparatus as claimed in any one of claims 1 or 2, wherein a damper is mounted in the inlet to control the gas flow into the housing.

6. A fabric filter apparatus as claimed in any one of claims 1 or 2, wherein the duct is provided with a bleed aperture at a lower portion thereof to allow escape of particulate matter falling out of the dusty gas in the duct.

7. A method of feeding a dusty gas to a dusty gas section of a fabric filter within a prismatic housing, said filter further including a clean gas section, a porting plate mounted between the dusty gas section and clean gas section with a circular array of fabric filter bags depending from the porting plate and a generation/distribution means to generate pulses of back flushing gas and distribute them periodically into the open upper ends of the fabric filter bags through respective ports in the porting plate, said method comprising feeding a first portion of the dusty gas directly into the housing at a position below or adjacent the bottom of the filter bag array and diverting a second portion of the dusty gas from a dusty gas inlet to the housing and delivering the diverted dusty gas to a level intermediate the inlet and the porting plate via spaced apart ducts formed at opposed lateral ends of the dusty gas inlet to the housing.

8. A method of feeding a dusty gas to a dusty gas section of a fabric filter as claimed in claim 7 wherein said inlet is provided by an elongated opening extending along a side of the housing, said dusty gas being diverted vertically upwards from a lateral end portion of said inlet opening.

9. A method of feeding a dusty gas to a dusty gas section of a fabric filter as claimed in claim 8 wherein said dusty gas is diverted vertically upwards from both lateral end portions of the elongated inlet.

10. A method of feeding a dusty gas to a dusty gas section of a fabric filter as claimed in claim 7 wherein said second portion is between 10% and 90% of the total dusty gas flow entering the filter.

11. A method of feeding a dusty gas to a dusty gas section of a fabric filter as claimed in claim 10 wherein said inlet is provided by an elongated opening extending along a side of the housing, said dusty gas being diverted vertically upwards from a lateral end portion of said inlet opening.

12. A method of feeding a dusty gas to a dusty gas section of a fabric filter as claimed in claim 11 wherein said dusty gas is diverted vertically upwards from both lateral end portions of the elongated inlet.

13. A method of feeding a dusty gas to a dusty gas section of a fabric filter as claimed in claim 7 wherein the housing is provided with a plurality of substantially planar sides, the dusty gas being diverted vertically upwards from both lateral ends of the elongated inlet.

* * * * *